(12) United States Patent
Kromrey et al.

(10) Patent No.: US 8,957,649 B2
(45) Date of Patent: Feb. 17, 2015

(54) MANUAL MULTI-PHASE VOLTAGE CONTROL

(75) Inventors: Timothy Mark Kromrey, Milwaukee, WI (US); Daniel Rian Kletti, Oak Creek, WI (US)

(73) Assignee: Cooper Technologies Company, Houston, TX (US)

( * ) Notice: Subject to any disclaimer, the term of this patent is extended or adjusted under 35 U.S.C. 154(b) by 280 days.

(21) Appl. No.: 13/483,275

(22) Filed: May 30, 2012

(65) Prior Publication Data

US 2013/0229162 A1 Sep. 5, 2013

Related U.S. Application Data

(60) Provisional application No. 61/605,627, filed on Mar. 1, 2012.

(51) Int. Cl.
*G05F 1/12* (2006.01)
(52) U.S. Cl.
USPC .......................................................... 323/282
(58) Field of Classification Search
CPC ................ G05F 1/08; G05F 1/12; G05F 1/67
USPC .................... 323/272, 275, 282–285
See application file for complete search history.

(56) References Cited

U.S. PATENT DOCUMENTS

| | | | |
|---|---|---|---|
| 3,668,511 A | 6/1972 | Lewis | |
| 4,413,189 A * | 11/1983 | Bottom, Jr. | ...................... 307/31 |
| 4,695,737 A | 9/1987 | Rabon et al. | |
| 5,736,827 A | 4/1998 | Dohnal et al. | |
| 5,821,716 A | 10/1998 | Okanik | |
| 6,337,802 B1 | 1/2002 | Larsson et al. | |
| 6,737,837 B1 | 5/2004 | Halvarsson et al. | |
| 7,180,206 B2 | 2/2007 | Haugs et al. | |
| 7,355,369 B2 | 4/2008 | Lavieville et al. | |
| 7,737,667 B2 | 6/2010 | Raedy | |
| 2005/0213356 A1 * | 9/2005 | Yanagida et al. | ............... 363/59 |
| 2009/0102438 A1 | 4/2009 | Raedy et al. | |
| 2010/0264666 A1 | 10/2010 | Bo et al. | |

FOREIGN PATENT DOCUMENTS

| | | |
|---|---|---|
| BR | PI0404107-0 A | 5/2006 |
| BR | PI0604133-7 A | 10/2008 |

OTHER PUBLICATIONS

Tapeletro, TAP Eletro Sistemas Ltda., "Single Phase Voltage Regulator Sychronizer", R.U.A. 01, User's Manual, Rev Jan. 2011, 33 pages.

* cited by examiner

*Primary Examiner* — Adolf Berhane
*Assistant Examiner* — Yemane Mehari
(74) *Attorney, Agent, or Firm* — King & Spalding LLP (57) ABSTRACT

Aspects of manual multi-phase voltage control are described. In one embodiment, a voltage regulator controller includes switches for coupling power from an energized phase to a de-energized phase. For example, the voltage regulator controller may include a first power switch electrically coupled to drive circuitry of a first voltage regulator, a first phase output voltage of a multi-phase power delivery system, and a second phase output voltage of the multi-phase power delivery system. In certain aspects, the first power switch selectively toggles an electrical coupling between the drive circuitry of the first voltage regulator and one of the first phase output voltage and the second phase output voltage. Powering a voltage regulator of a de-energized phase with power from an energized phase may peg the operation of the voltage regulator, as necessary, to maintain the balance of the power distribution system, for example.

20 Claims, 7 Drawing Sheets

MANUAL MULTI-PHASE VOLTAGE CONTROL

RELATED APPLICATION

This application claims priority under 35 U.S.C. §119 to U.S. Provisional Patent Application Ser. No. 61/605,627, filed Mar. 1, 2012, and entitled "Multi-Phase Operation with Single Phase Control," the entire contents of which are hereby incorporated herein by reference for all purposes.

TECHNICAL FIELD

The present disclosure generally relates to control of a multi-phase voltage regulator controller and, particularly, to manual voltage control among multiple phases of a multi-phase power delivery system controlled by the multi-phase voltage regulator controller.

BACKGROUND

Power distribution and delivery systems are used to deliver power from generation sites to end users. A power delivery system may include a source of power generation such as a nuclear, coal, natural gas, or hydroelectric power plant, for example, a transmission system including transmission lines, and various substations and transformers that increase and decrease voltages on the system for power transmission and end delivery. These systems commonly include voltage regulators that operate to maintain a near-constant line output voltage for one or more phases of power being delivered. In the United States, for example, the voltage regulators may seek to maintain a 120 VAC (RMS) nominal output line voltage on one or more output phases of the system.

In some cases, power failures on the power delivery system occur. As such, the line output voltage of one or more phases of the power delivery system may drop. In other situations, maintenance of the power delivery system requires that one or more phases be disconnected or de-energized. Even when a phase of the power delivery system is de-energized, in certain circumstances, it may be desirable to operate or control a voltage regulator of the de-energized phase. However, power is generally required to operate a voltage regulator. For example, power may be required to operate a motor of a tap changer used to change tap positions on an autotransformer. Further, depending upon the configuration of the system, when a part of a power delivery system is de-energized, it may be necessary to provide power from another source to operate one or more voltage regulators of the system.

Meanwhile, it would be desirable to lower the costs of operating and maintaining power delivery systems. It certain aspects, the maintenance of power delivery systems requires the skill of a lineman, field technician, or other person to diagnose, configure, repair, and maintain the system. It is noted that any system components that permit technicians to quickly diagnose, configure, repair, and maintain the system may help to reduce costs. Further, such components may help to quickly restore power and maintain high overall levels of operating service. In this context, it is noted that system components of power delivery systems which offer flexible solutions are desirable.

SUMMARY

In one embodiment, a multi-phase voltage regulator controller is described. In certain aspects, the voltage regulator controller includes a first switch of a relay and a first power switch comprising a common pole, a first pole, and a second pole. The common pole of the first power switch may be electrically coupled to drive circuitry of a first voltage regulator of a multi-phase power delivery system, the first pole of the first power switch may be electrically coupled to a first phase output voltage of the multi-phase power delivery system, and the second pole of the first power switch may be electrically coupled to a common pole of the first switch of the relay.

In certain embodiments, the multi-phase voltage regulator controller may further include a second switch of the relay and a second power switch comprising a common pole, a first pole, and a second pole. The common pole of the second power switch may be electrically coupled to drive circuitry of a second voltage regulator of the multi-phase power delivery system, the first pole of the second power switch may be electrically coupled to a second phase output voltage of the multi-phase power delivery system, and the second pole of the second power switch may be electrically coupled to a common pole of the second switch of the relay.

Further, in certain embodiments, the multi-phase voltage regulator controller may include a third switch of the relay and a third power switch comprising a common pole, a first pole, and a second pole. The common pole of the third power switch may be electrically coupled to drive circuitry of a third voltage regulator of the multi-phase power delivery system, the first pole of the third power switch may be electrically coupled to a third phase output voltage of the multi-phase power delivery system, and the second pole of the third power switch may be electrically coupled to a common pole of the third switch of the relay.

In another embodiment, a multi-phase voltage regulation system is described. In certain aspects, the multi-phase voltage regulation system includes a first voltage regulator of a multi-phase power delivery system and a voltage regulator controller. The voltage regulator controller may include a first power switch electrically coupled to drive circuitry of the first voltage regulator, a first phase output voltage of the multi-phase power delivery system, and a second phase output voltage of the multi-phase power delivery system.

In still another embodiment, a method of powering a multi-phase voltage regulator controller is described. In certain aspects, the method includes determining whether a first phase output voltage of a multi-phase power delivery system has dropped. When the first phase output voltage has dropped and no external power is connected to the voltage regulator controller, the method may further include coupling an output voltage of the multi-phase power delivery system other than the first phase output voltage to drive circuitry of a first voltage regulator of the multi-phase power delivery system. Alternatively, when the first phase output voltage has dropped and external power is connected, the method may further include coupling power from an external power source to the drive circuitry of the first voltage regulator.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments described herein and the advantages thereof, reference is now made to the following description, in conjunction with the accompanying figures briefly described as follows.

The drawings illustrate only exemplary embodiments and are therefore not to be considered limiting of the embodiments described herein, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey certain principles. In the drawings, similar reference numerals between figures designates like or corresponding, but not necessarily identical, elements.

DETAILED DESCRIPTION

In the following paragraphs, the present invention will be described in further detail by way of example with reference to the attached drawings. In the description, well known components, methods, and/or processing techniques are omitted or briefly described so as not to obscure the invention.

Figure 1:
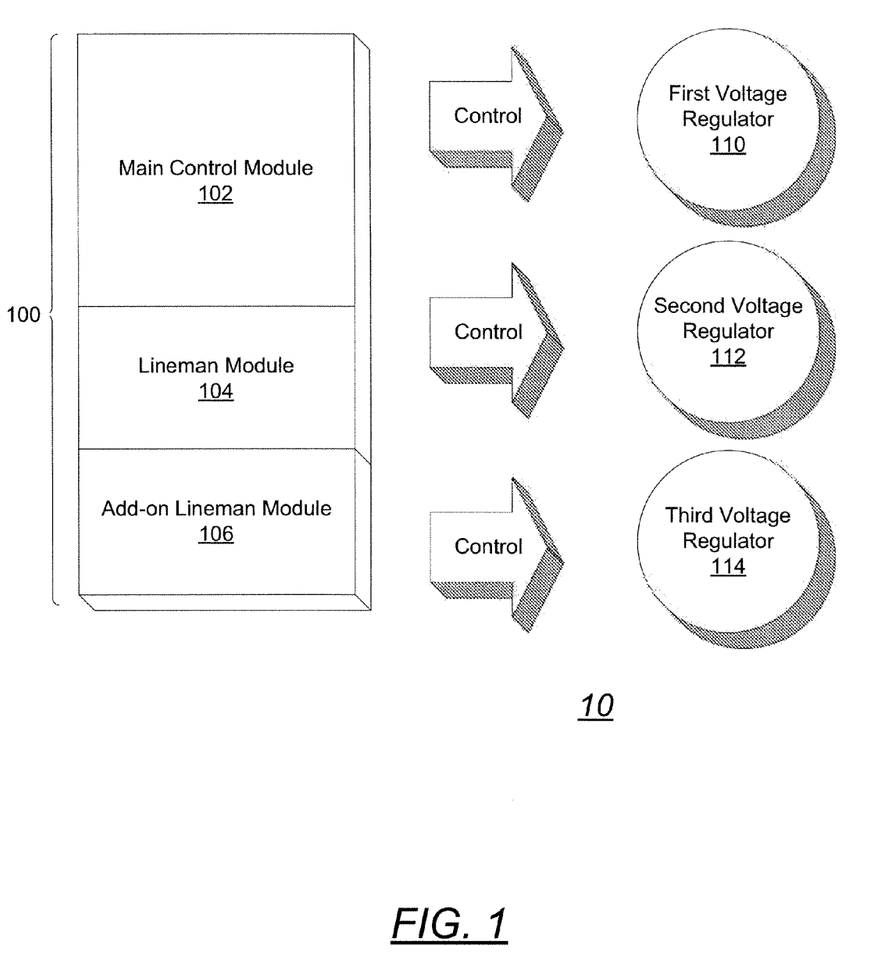
FIG. 1 illustrates an example embodiment of a system for voltage regulation.

Turning now to the drawings, in which like numerals indicate like elements throughout, exemplary embodiments of the invention are described in detail. FIG. 1 illustrates an example embodiment of a system 10 for voltage regulation. Referring to FIG. 1, the system includes a voltage regulator controller 100 and first, second, and third voltage regulators 110, 112, and 114. The voltage regulator controller 100 comprises a main control module 102, a lineman module 104, and an add-on lineman module 106. Generally, the voltage regulator controller 100 regulates the output voltage of the voltage regulators 110, 112, and 114. In one embodiment, as illustrated in FIG. 1, the voltage regulator controller 100 regulates the output line voltages of multiple phases of a multi-phase power delivery system using the voltage regulators 110, 112, and 114. Each of the voltage regulators 110, 112, and 114 is respectively controlled by the voltage regulator controller 100 to regulate a line output voltage of one phase of the multi-phase power delivery system. In one embodiment, each of the voltage regulators 110, 112, and 114 includes an autotransformer comprising multiple taps which may be selected by a tap changer driven by a motor. In that context, the voltage regulator controller 100 provides control and/or power to each of the voltage regulators 110, 112, and 114 to operate the motors of the tap changers of the voltage regulators 110, 112, and 114, to regulate the line output voltage of each. Among embodiments, it is noted that the voltage regulators 110, 112, and 114 may comprise any suitable type of voltage regulator understood by those having skill in the art, without limitation.

The voltage regulator controller 100 is designed to control the voltage regulators 110, 112, and 114 automatically or manually. That is, in certain embodiments, the voltage regulator controller 100 comprises control circuitry including a processor, for example, that automatically controls the operation of the voltage regulators 110, 112, and 114. The voltage regulator controller 100 further comprises switches, for example, for manual control of the operation of the voltage regulators 110, 112, and 114, as described in further detail below. In one embodiment, the lineman module 104 includes the switches for the manual control of the first voltage regulator 110, and the add-on lineman module 106 includes the switches for the manual control of the second and third voltage regulators 112 and 114.

As one example of automatic voltage regulation by the voltage regulator controller 100, the voltage regulator controller 100 is configured to automatically regulate a first phase of the multi-phase power delivery system to maintain about a near-constant 120 VAC nominal output line voltage using the first voltage regulator 110. Further, the voltage regulator controller 100 regulates second and, in certain embodiments, third phases of the multi-phase power delivery system to maintain about a near-constant 120 VAC nominal output line voltage using the second and third voltage regulators 112 and 114. It is noted that, in various embodiments, the voltage regulator controller 100 may regulate one or more of the phases of the multi-phase power delivery system to voltages other than 120 VAC, in either automatic or manual modes of operation. It is also noted that, although the multi-phase power delivery system is described as having three phases, greater or fewer phases are within the scope of the embodiments described herein.

Figure 2:
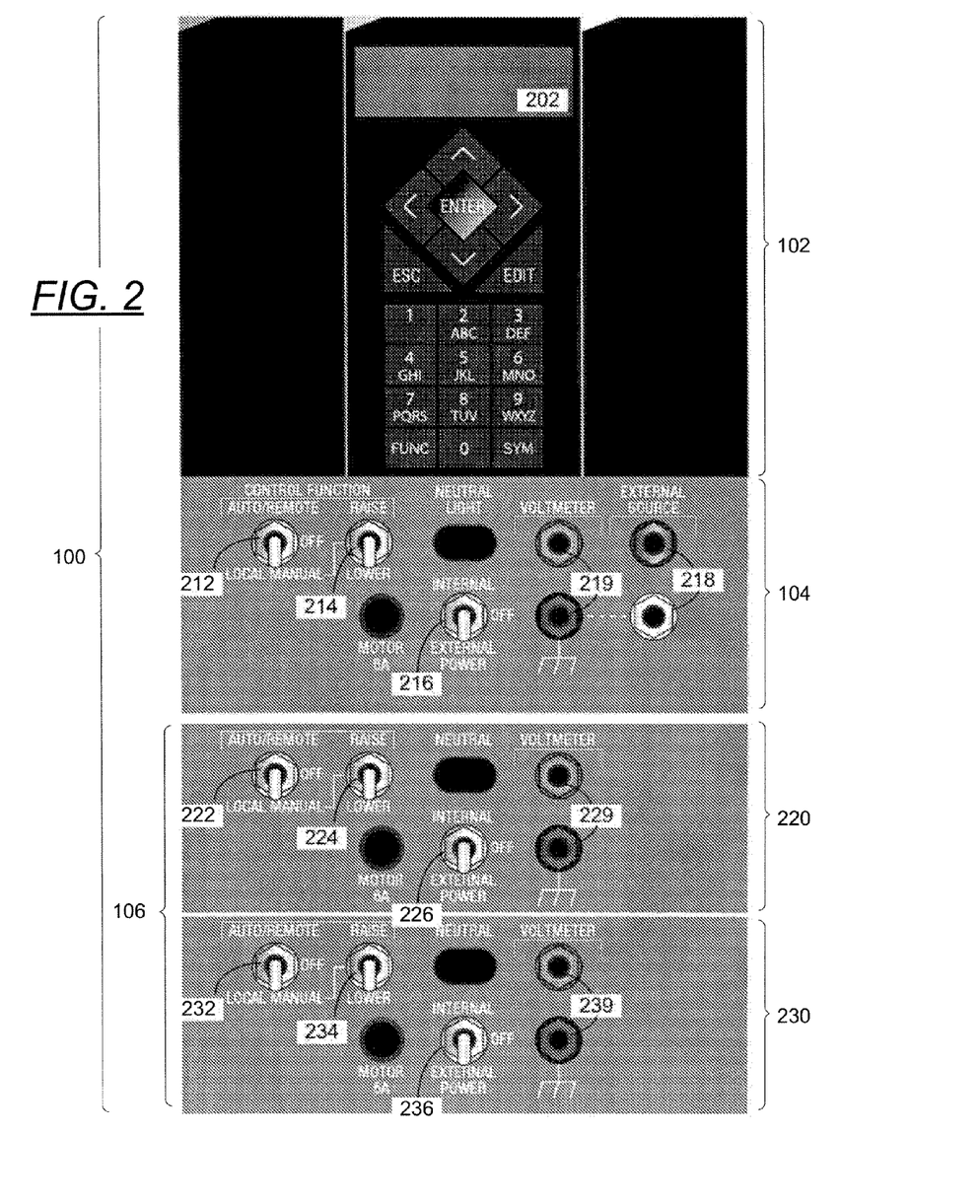
FIG. 2 illustrates an example of a front panel of a voltage regulator controller.

Turning to FIG. 2, an example of a front panel of the voltage regulator controller 100 is illustrated. The lineman module 104 comprises control switches 212 and 214 and power switch 216, for manual control of the first voltage regulator 110. Particularly, using the auto/remote control switch 212, control of the first voltage regulator 110 can be set to either "auto/remote" or "local manual" control. That is, for a first "auto/remote" position of the switch 212, the voltage regulator controller 100 automatically and independently controls the first voltage regulator 110. For a second "local manual" position of the switch 212, the first voltage regulator 110 is manually controlled using the "raise/lower" switch 214. Using the switch 214, a current tap setting of the first voltage regulator 110 may be raised or lowered, for example, by providing power to the tap change motor of the first voltage regulator 110 via drive circuitry, as described in further detail below. The switch 212 also includes an off position. When the switch 212 is at the off position, the voltage regulator controller 100 does not control the first voltage regulator 110, automatically or manually. The lineman module 104 also comprises external power source and voltmeter connection terminals 218 and 219, respectively, for feeding external power to the voltage regulator controller 100 and checking a line output voltage of the first voltage regulator 110.

The add-on lineman module 106 comprises a first section 220 for manual control of the second voltage regulator 112, and a second section 230 for manual control of the third voltage regulator 114. The first section 220 includes control switches 222 and 224 and power switch 226. Using the auto/remote control switch 222, control of the second voltage regulator 112 can be set to either "auto/remote" or "local manual" control. That is, in a first "auto/remote" mode setting of the switch 222, the voltage regulator controller 100 automatically and independently controls the second voltage regulator 112. In a second "local manual" mode setting of the switch 222, the second voltage regulator 112 is manually controlled using the "raise/lower" switch 224. Using the switch 224, a current tap setting of the second voltage regulator controller 112 may be raised or lowered, for example, by providing power to the tap change motor of the second voltage regulator 112. The switch 222 also includes an off position. The first section 220 also comprises voltmeter connection terminals 229 for checking a line output voltage of the second voltage regulator 112.

The second section 230 includes control switches 232 and 234 and power switch 236. Using the auto/remote control switch 232, control of the third voltage regulator 114 can be set to either "auto/remote" or "local manual" control. That is, in a first "auto/remote" mode setting of the switch 232, the voltage regulator controller 100 automatically and independently controls the third voltage regulator 114. In a second "local manual" mode setting of the switch 232, the third voltage regulator 114 is manually controlled using the "raise/lower" switch 234. Using the switch 234, a current tap setting of the third voltage regulator controller 114 may be raised or lowered, for example, by providing power to the tap change motor of the third voltage regulator 114. The switch 232 also includes an off position. The second section 230 also comprises voltmeter connection terminals 239 for checking a line output voltage of the third voltage regulator 114.

While the voltage regulator controller 100 operates in automatic mode, the power necessary to drive the motors of the tap changers of the voltage regulators 110, 112, and 114 may be electronically switched on or off using drive circuitry of the voltage regulator controller 100, under the direction of the control circuitry of the voltage regulator controller 100. For example, the power to drive the motors of the tap changers of the voltage regulators 110, 112, and 114 may be electronically switched on or off using drive circuitry including, for example, triacs, relays, or Integrated Gate Bipolar Transistors (IGBTs), among other suitable elements known to those having ordinary skill in the art, without limitation. As described herein, circuitry that electrically couples power to drive the motors of the tap changers of the voltage regulators 110, 112, and 114 comprises drive circuitry.

Alternatively, when the control switches 212, 222, and 232 are set to the "local manual" control position, a lineman, field technician, or other person (hereinafter "lineman") can manually drive the motors of the tap changers of the voltage regulators 110, 112, and 114, respectively, using the control switches 214, 224, and 234. For example, the lineman may read the display 202 and/or other indicators which are updated by the main control module 102, to determine the respective line output voltages of each of the voltage regulators 110, 112, and 114. Alternatively or additionally, the lineman may also manually check the respective line output voltages of each of the voltage regulators 110, 112, and 114 using the voltmeter connection terminals 219, 229, and 239. In turn, to set the respective line output voltages of each of the voltage regulators 110, 112, and 114, the lineman can manually drive the motors of the tap changers of the voltage regulators 110, 112, and 114 (via the drive circuitry of the voltage regulator controller 100) using the control switches 214, 224, and 234.

It is noted that, in the manual mode of operation, the raise/lower switch 214 manually controls tap changes on the voltage regulator 110 via the drive circuitry of the voltage regulator controller 100. In one embodiment, in the manual mode of operation, the raise/lower switch 214 manually controls the drive circuitry of the voltage regulator controller 100, manually providing power to the first voltage regulator 110. Specifically, when the auto/manual switch 212 is set to manual mode, the voltage regulator controller 100 provides power to the tap change motor of the first voltage regulator 110 based on the raise/lower switch 214 and not based on automatic control from the control circuitry of the voltage regulator controller 100. Similarly, in the manual mode of operation, the raise/lower switches 224 and 234 manually control the drive circuitry of the voltage regulator controller 100, manually providing power to the second and third voltage regulators 112 and 114.

Using the internal/external power switches 216, 226, and 236, the lineman can select whether the power to operate the motors of the tap changers of the voltage regulators 110, 112, and 114 is supplied internally (i.e., from the output line voltages of the phases being regulated) or from an external source via the external power source terminals 218. For example, as described in further detail below with reference to FIG. 3, the power to operate the motors of the tap changers of the voltage regulators 110, 112, and 114 may be supplied by the line output voltages of the regulators themselves (i.e., supplied internally).

In some cases, power failures on the power delivery system occur. As such, the line voltage of one or more phases of the power delivery system may drop, even to a level too low to supply sufficient power to change taps on the phase(s). In other situations, maintenance of the power delivery system may require that one or more phases be disconnected or de-energized. Even when a phase of the power delivery system is de-energized, in certain circumstances, it may be desirable to control the voltage regulator of the de-energized phase. For example, if the second phase of the power delivery system is de-energized, the voltage regulators 110 and 114 of the remaining energized first and third phases may still be controlled by the voltage regulator controller 100 to updated tap positions based on changing demands for power from the system. Meanwhile, if the second voltage regulator controller 112 is not being controlled to an updated tap position, when the second phase is re-energized, the system may become imbalanced if the first and third phases are set to respective tap positions that are substantially apart from the second phase, for example. It may be desirable to control the voltage regulator of a de-energized phase in other circumstances, for example, such as when testing a new installation of a voltage regulator controller and associated voltage regulators.

As described in further detail below, the voltage regulator controller 100 is designed with additional flexibility for powering a voltage regulator of a de-energized phase of a power delivery system. Particularly, the voltage regulator controller 100 is designed with the flexibility to provide power to operate the motors of the tap changers of the voltage regulators 110, 112, and 114 between phases. Especially when power is lost on one or more phases of a power delivery system, this flexibility can help save time and operating costs, for example. Generally, the voltage regulator controller 100 according to the embodiments described herein provides a lineman with multiple options for powering the tap change motor of a voltage regulator quickly and easily.

Figure 3:
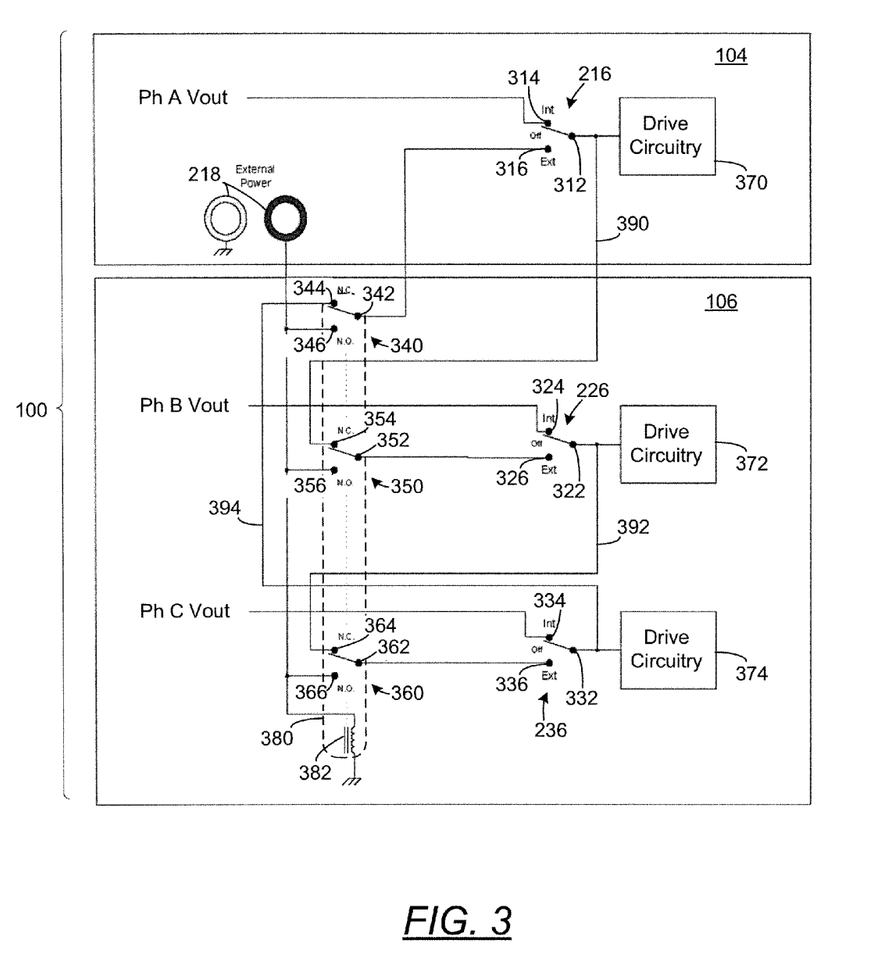
FIG. 3 illustrates an example schematic diagram among certain elements of a voltage regulator controller.

Turning to FIG. 3, an example schematic diagram among certain elements of the voltage regulator controller 100 is illustrated. The voltage regulator controller 100 includes the lineman module 104 and the add-on lineman module 106, as discussed above. The lineman module 104 includes the external power source terminals 218, drive circuitry 370 of the first voltage regulator 110, and the first power switch 216, as discussed above with reference to FIG. 2. The add-on lineman module 106 includes drive circuitry 372 of the second voltage regulator 112 and drive circuitry 374 of the third voltage regulator 114. The add-on module 106 further includes the second power switch 226 and the third power switch 236, as discussed above with reference to FIG. 2.

The voltage regulator controller 100 further includes a relay 380. The relay 380 includes the relay coil 382 and first, second, and third switches 340, 350, and 360 of the relay 380. Among embodiments, the relay 380 may comprise any electrically operated switch suitable for the application, as understood by those having ordinary skill in the art. In certain exemplary embodiments, the relay coil 382 is a coil of an electromagnet of the relay 380. The electromagnet of the relay 380 operates the first, second, and third switches 340, 350, and 360 of the relay 380. Particularly, depending upon whether current flows through the relay coil 382, the electromagnet of the relay 380 toggles the first, second, and third switches 340, 350, and 360 of the relay coil 382 between "normally-open" and "normally-closed" positions, as discussed in further detail below.

The first power switch 216 comprises a common pole 312, a first pole 314, and a second pole 316. The second power switch 226 comprises a common pole 322, a first pole 324, and a second pole 326. The third power switch 236 comprises a common pole 332, a first pole 334, and a second pole 336. For each of the first, second, and third power switches, the switch electrically couples one of the first and second poles to the common pole based on the position of the switch. As described herein, when any one of the power switches is toggled to electrically couple its common pole to its first pole, the power switch is set to its "internal" position. Further, when any one of the power switches is toggled to electrically couple its common pole to its second pole, the power switch is set to its "external" position. Among embodiments, the first, second, and third power switches 216, 226, and 236 may comprise any switch suitable for the application, as understood by those having ordinary skill in the art, without limitation. For example, the switches 216, 226, and 236 may comprise toggle, dolly, rocker, or any similar type of switch. Similarly, the switches 212, 214, 222, 224, 232, and 234 may also comprise any switch suitable for the application, such as toggle, dolly, rocker, or any similar type of switch, without limitation. In certain exemplary embodiments, the first, second, and third power switches 216, 226, and 236 comprise single pole double throw (SPDT) switches.

As illustrated in FIG. 3, the common pole 312 of the first power switch 216 is electrically coupled to the drive circuitry 370 of the first voltage regulator 110. The first pole 314 of the first power switch 216 is electrically coupled to the first phase output voltage of the multi-phase power delivery system, "Ph A Vout." That is, the first pole 314 of the first power selection switch 216 is electrically coupled to the first phase line output from the first voltage regulator 110. The second pole 316 of the first power selection switch 216 is electrically coupled to a common pole 342 of the first switch 340 of the relay 380.

The common pole 322 of the second power switch 226 is electrically coupled to the drive circuitry 372 of the second voltage regulator 112. The first pole 324 of the second power selection switch 226 is electrically coupled to a second phase output voltage of the multi-phase power delivery system, "Ph B Vout." That is, the first pole 324 of the second power selection switch 226 is electrically coupled to the second phase line output from the second voltage regulator 112. The second pole 326 of the second power selection switch 226 is electrically coupled to the common pole 352 of the second switch 350 of the relay.

The common pole 332 of the third power switch 236 is electrically coupled to the drive circuitry 374 of the third voltage regulator 114. The first pole 334 of the third power selection switch 236 is electrically coupled to a third phase output voltage of the multi-phase power delivery system, "Ph C Vout." That is, the first pole 334 of the third power selection switch 236 is electrically coupled to the third phase line output from the third voltage regulator 114. The second pole 336 of the third power selection switch 236 is electrically coupled to the common pole 362 of the third switch 360 of the relay.

As further illustrated in FIG. 3, a first terminal of the external power source terminals 218 is electrically coupled to each of the second poles 346, 356, and 366 of the first, second, and third switches 340, 350, and 360 of the relay 380. A second terminal of the external power source terminals 218 is coupled to a common ground. The first terminal of the external power source terminals 218 is also electrically coupled to the relay coil 382 of the relay 382.

In operation, the first, second, and third power switches 216, 226, and 236 may be used by the lineman to electrically couple power from one phase of the multi-phase power delivery system to drive circuitry of a voltage regulator of another phase of the multi-phase power delivery system. Particularly, in circumstances when an output voltage of one phase of the multi-phase power delivery system drops, the particular configuration of the electrical couplings among the first, second, and third power switches 216, 226, and 236 (and the other elements illustrated in FIG. 3), permit the lineman to electrically couple power from one phase to the drive circuitry of another phase. Thus, as discussed above, the lineman is able to change taps on a voltage regulator, even in circumstances where the voltage regulator is coupled to a de-energized phase.

Figure 4:
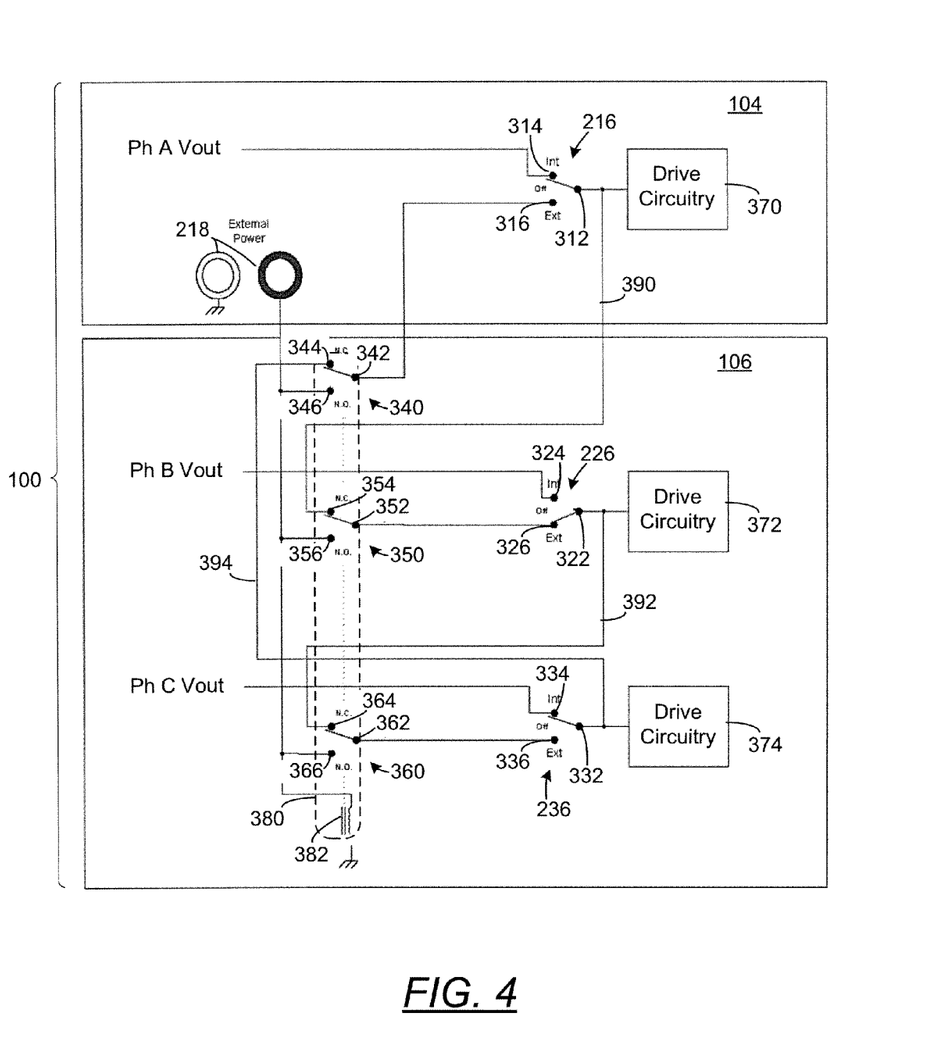
FIG. 4 illustrates an example schematic diagram of coupling power among phases in a voltage regulator controller.

Turning to FIG. 4, an example schematic diagram illustrating the coupling of power among phases is described. FIG. 4 is provided in the context of a de-energization, voltage drop, or other power loss or failure on the second phase of the multi-phase power delivery system. For example, in this case, the line output voltage "Ph B Vout" has dropped to a voltage too low to power the voltage regulator 112. As such, sufficient power cannot be supplied to the drive circuitry 372 to operate the tap changer motor of the second voltage regulator 112. As described above, this condition may be detected by the voltage regulator controller 100 and displayed on the display 202 of the voltage regulator controller 100. Alternatively, this condition may be determined using an external voltmeter and the voltmeter connection terminals 229. As described above, in this condition, the second voltage regulator 112 cannot change tap positions, because sufficient power to drive the motor of the tap changer of the second voltage regulator 112 is unavailable.

To provide power to the drive circuitry 372 and control the second voltage regulator 112 to change tap positions, the second power switch 226 is toggled to the "external" position, as illustrated in FIG. 4. Specifically, the common pole 322 of the second power switch 226 is coupled to the second pole 326 of the second power switch 226. In this position, power is coupled from the first phase of the multi-phase power delivery system to the second phase. Particularly, the "Ph A Vout" power is coupled from the first phase via the electrical coupling 390, through the second switch 350 of the relay 380 (which is in the normally closed position), and through the second power switch 226 to the drive circuitry 372. In this case, the power provided by the first phase of the multi-phase power delivery system supports both the drive circuitry 370 as well as the drive circuitry 372. Thus, both the first and second voltage regulators 110 and 112 may be operated to change tap positions, even if the second phase of the multi-phase power delivery system is de-energized. Among embodiments, once coupled to the power from the first phase, the drive circuitry 372 may be controlled either automatically or manually to operate (i.e., change tap positions of) the second voltage regulator 112.

In the embodiment illustrated in FIG. 4, the coupling of power between the first and second phases of the multi-phase power delivery system is achieved by the toggle of the second power selection switch 226, to electrically couple the common pole 322 to the second pole 326. In other words, the lineman is able to easily reconfigure the voltage regulator controller 100 to couple power from the first phase to the second phase and provide power to the drive circuitry 372 by using only the power selection switch 226.

Figure 5:
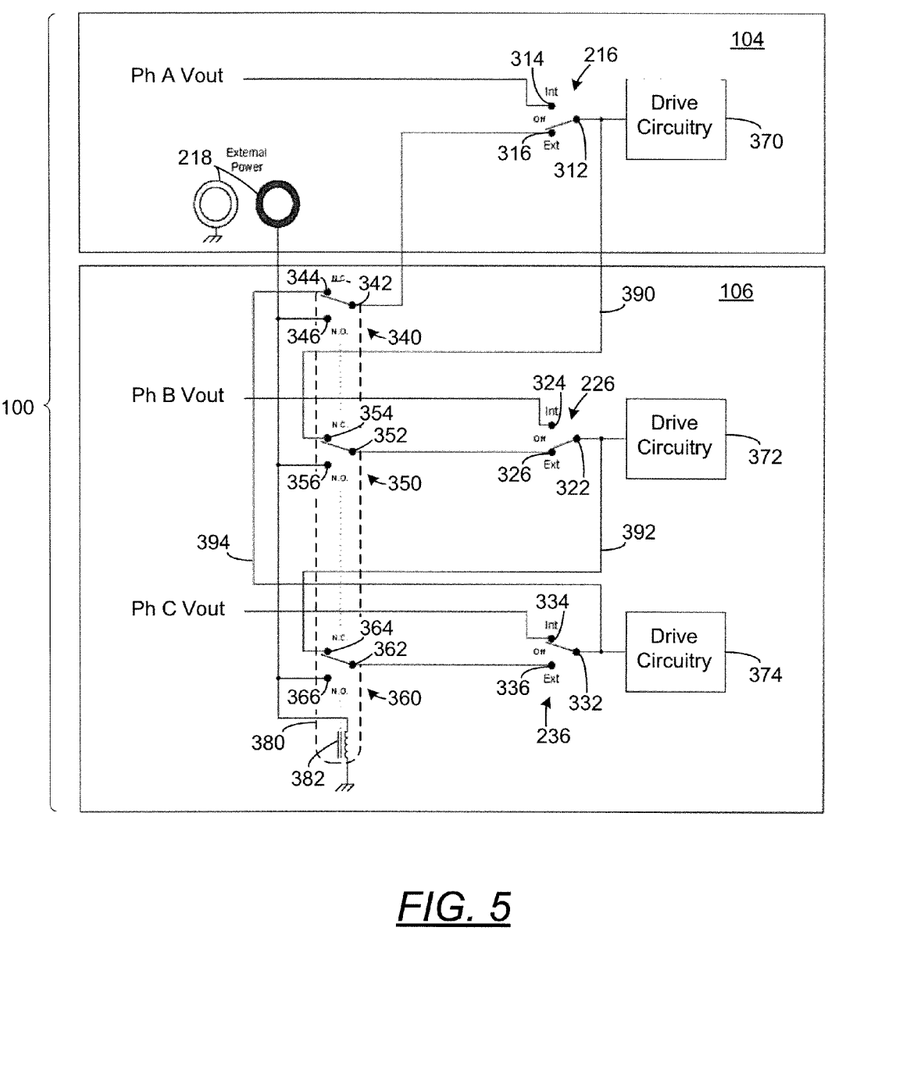
FIG. 5 illustrates another example schematic diagram of coupling power among phases in a voltage regulator controller.

Turning to FIG. 5, another example schematic diagram illustrating the coupling of power among phases is described. FIG. 5 is provided in the context of a de-energization, voltage drop, or other power loss or failure on both the first and second phases of the multi-phase power delivery system. In this case, power may be coupled between the third phase and the first and second de-energized phases. As illustrated in FIG. 5, both the first and second power switches 216 and 226 are toggled to the "external" position. As for the first power switch 216, the common pole 312 of the first power switch 216 is coupled to the second pole 316 of the first power switch 216. In this position, power is coupled from the third phase of the multi-phase power delivery system to the first phase. Particularly, the "Ph C Vout" power is coupled from the third phase via the electrical coupling 394, through the first switch 340 of the relay 380 (which is in the normally closed position), and through the first power switch 216 to the drive circuitry 370. As such, power on the third phase is electrically coupled to the drive circuitry 370 and is available to provide power to operate the tap change motor of the first voltage regulator 110.

As for the second power switch 226, the common pole 322 of the second power switch 226 is coupled to the second pole 326 of the second power switch 226. In this position, power is coupled from the first phase of the multi-phase power delivery system to the second phase. Particularly, power from the first phase is coupled via the electrical coupling 390, through the second switch 350 of the relay 380 (which is in the normally closed position), and through the second power switch 226 to the drive circuitry 372. In this case, the "Ph C Vout" power from the third phase is coupled to the first phase and further coupled from the first phase to the second phase. As such, power on the third phase is electrically coupled to both the drive circuitry 370 and the drive circuitry 372 and is available to provide power to operate the tap change motors of both the first and second voltage regulators 110 and 112.

Further to the examples described with reference to FIGS. 3 and 4, it should be appreciated that the first, second, and third power switches 216, 226, and 236 may be toggled to either "internal" or "external" positions. Based on the respective positions of the first, second, and third power switches 216, 226, and 236, power may be electrically coupled in various manners and configurations via the electrical couplings 390, 392, and 394 and through the first, second, and third switches 340, 350, and 360 of the relay 380 between the phases of the multi-phase power delivery system.

With reference again to FIG. 3, operational aspects of the relay 380 are described. As noted above, the first terminal of the external power source terminals 218 is electrically coupled to the relay coil 382 of the relay 380. Further, as noted above, the external power source terminals 218 may be used by the lineman to electrically couple power to the voltage regulator controller 100 from an external source. For example, the lineman may use external cabling to extend power from various alternative power sources that may be available at a location where the voltage regulator controller 100 is installed to the external power source terminals 218.

When power is connected from an external source to the external power source terminals 218, current flows in the relay coil 382. In turn, the electromagnet in the relay 380 is operated based on the current in the relay coil 382 to toggle the first, second, and third switches 340, 350, and 360 of the relay 380 between the "normally-open" and "normally-closed" positions. As described herein, when any one of the first, second, and third switches 340, 350, and 360 of the relay 380 is positioned to electrically couple its common pole to its first pole, the switch is set to its normally-closed position. Alternatively, when any one of the switches 340, 350, and 360 of the relay 380 is toggled to electrically couple its common pole to its second pole, the switch is set to its normally-open position. Thus, the toggle of the first, second, and third switches 340, 350, and 360 of the relay 380 is based on whether current flows in the relay coil 382. Based on the electrical connection between the first terminal of the external power source terminals 218 to the relay coil 382, current generally flows in the relay coil 382 when external power is provided to the external power source terminals 218. Thus, when external power is electrically coupled to the external power source terminals 218, the flow of current in the relay coil 382 causes each of the first, second, and third switches 340, 350, and 360 of the relay 380 to toggle from their normally-closed to normally-open positions.

As illustrated in FIG. 3, when the first, second, and third switches 340, 350, and 360 of the relay 380 toggle from their normally-closed to normally-open positions, it is no longer possible to couple power between phases of the multi-phase power delivery system via the electrical couplings 390, 392, and 394, regardless of the toggle positions of the power switches 216, 226, and 236. Instead, for any of the first, second, and third power switches 216, 226, and 236 toggled to the external position, power from the external power source terminals 218 is coupled to the associated drive circuitry 370, 372, and 374. Particularly, power coupled to the external power source terminals 218 is coupled from the second poles 346, 356, and 366 of the respective first, second, and third switches 340, 350, and 360 of the relay 380 to the "external position" second poles 316, 326, and 336 of the first, second, and third power switches 216, 226, and 236 and to the associated drive circuitry 370, 372, and 374.

It is noted that, when external power is provided at the external power source terminals 218, it generally becomes unnecessary to couple power between phases of the multi-phase power delivery system. As noted above, based on the configurations of the power switches 216, 226, and 236 among the other elements of the voltage regulator controller 100, the voltage regulator controller 100 provides flexibility for powering voltage regulators of a de-energized phases of a power delivery system. That is, the voltage regulator controller 100 is designed with additional flexibility to provide power to operate the motors of the tap changers of voltage regulators, particularly under circumstances when power is lost on one or more phases. The flexibility provided by the voltage regulator controller 100 according to the embodiments described herein can help to save time and operating costs, for example. Additionally, the voltage regulator controller 100 according to the embodiments described herein provides a lineman with multiple options for powering the tap change motor of a voltage regulator quickly and easily.

Figure 6A:
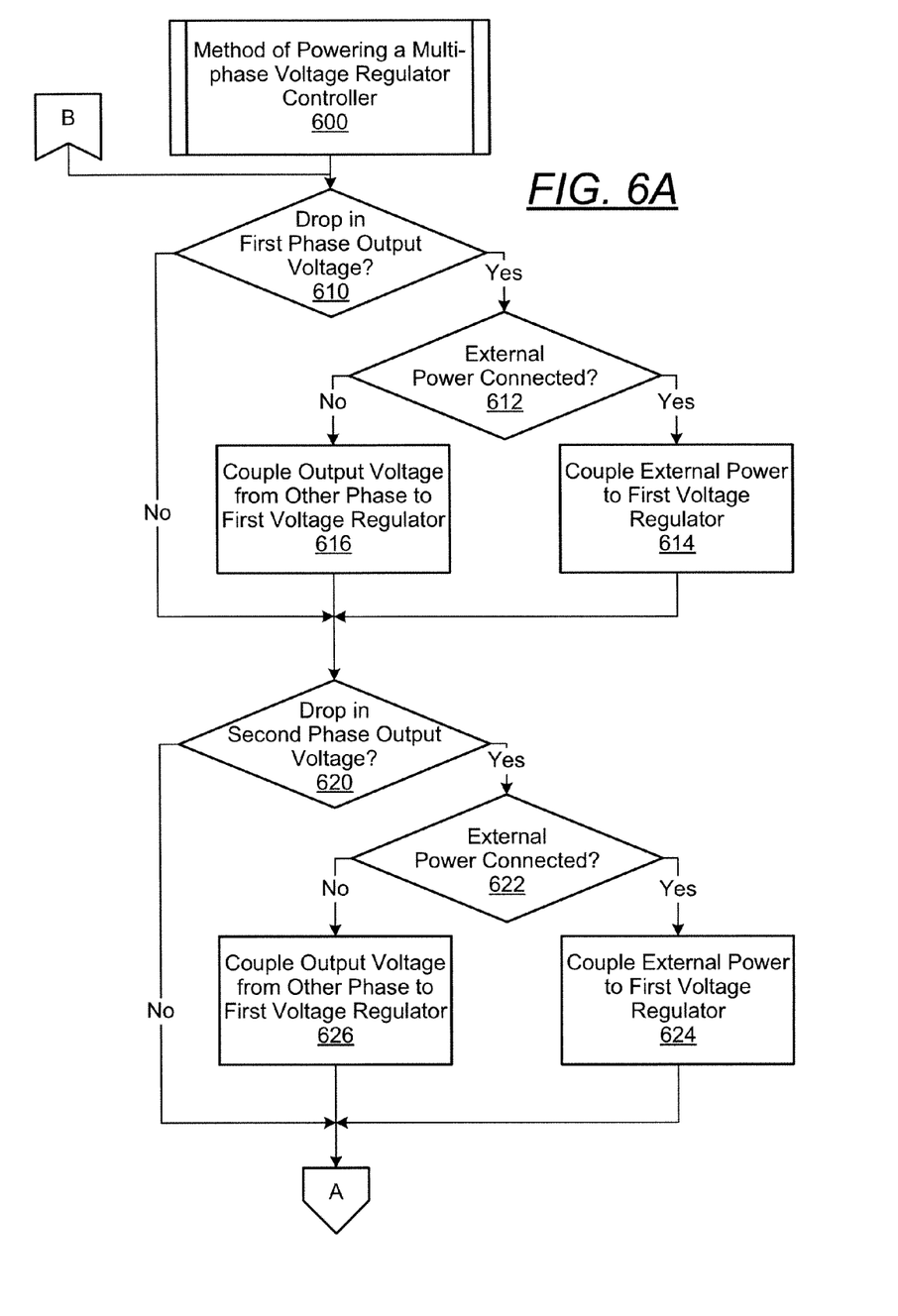
FIG. 6A illustrates an example embodiment of a method of powering a multi-phase voltage regulator controller.
Figure 6B:
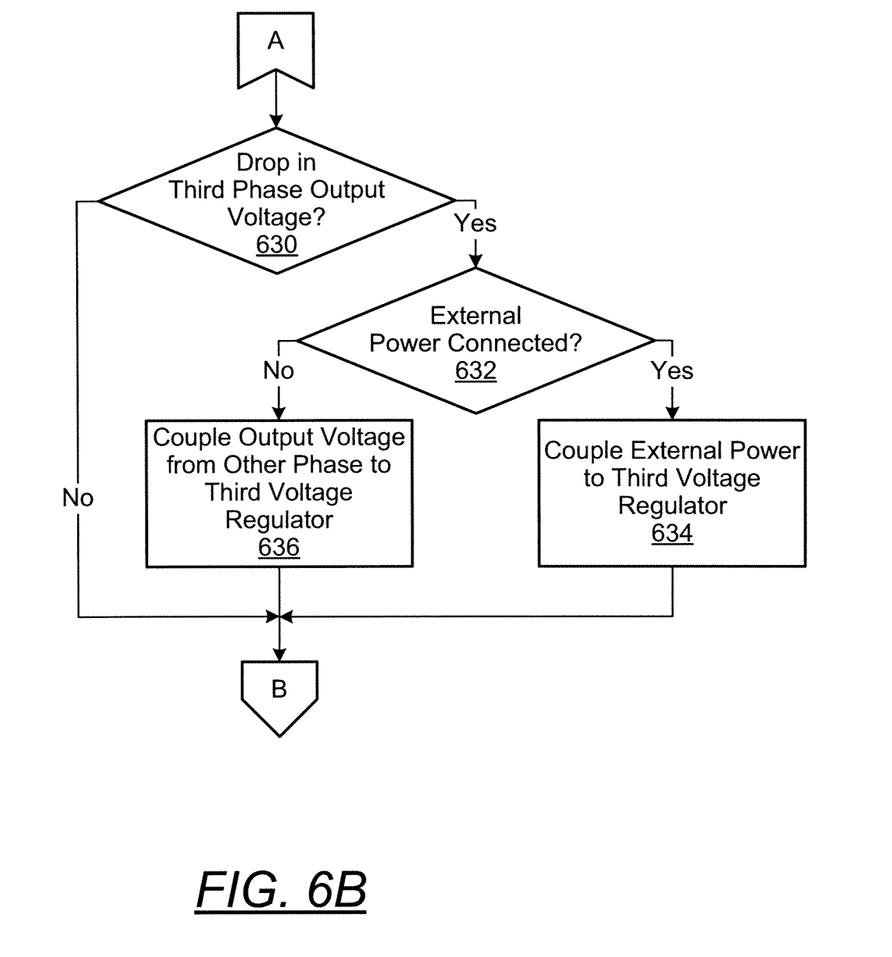
FIG. 6B further illustrates an example embodiment of a method of powering a multi-phase voltage regulator controller.

Before turning to the process flow diagrams of FIGS. 6A and 6B, it is noted that the process flows may be practiced using an alternative order of the steps illustrated in FIGS. 6A and 6B. That is, the process flows illustrated in FIGS. 6A and 6B are provided as examples only, and may be practiced using flows that differ from those illustrated. Additionally, it is noted that not all steps are required in every embodiment. In other words, one or more of the steps may be omitted or replaced, without departing from the spirit and scope of the embodiments described herein. In alternative embodiments, steps may be performed in different orders, in parallel with one another, or omitted entirely, and/or certain additional steps may be performed without departing from the scope and spirit of the embodiments described herein.

Turning to FIG. 6A, an example embodiment of a method 600 of powering a multi-phase voltage regulator controller is described. At the outset it is noted that, while the method 600 is described with reference to the voltage regulator controller 100, the process of the method 600 may be practiced with equivalent controllers and other means as would be understood and recognized by those having ordinary skill in the art.

At step 610, the method 600 begins with determining whether a first phase output voltage of a multi-phase power delivery system has dropped. In this context, the drop may be attributed to a de-energization, disconnection, or other power loss or failure on the first phase of the multi-phase power delivery system. The drop may be determined with reference to the display 202 and/or other indicators of the main control module 102, which may indicate when certain phases of a multi-phase power delivery system have dropped in line voltage below a certain preconfigured level. Alternatively or additionally, the drop may also be using a voltmeter on the connection terminals 219 of the voltage regulator controller 100.

When it is determined, at step 610, that the first phase output voltage has dropped, the process proceeds to step 612. Based on whether external power is connected, the method 600 further proceeds to either step 614 or 616. Particularly, if external power is disconnected, the process proceeds to step 616. Alternatively, if external power is connected, the process proceeds to step 614. With reference to the voltage regulator controller 100 as an example, external power may be connected at the external power source terminals 218 and, depending upon whether power is connected at the external power source terminals 218, the method 600 proceeds to either step 614 or 616.

At step 616, when the first phase output voltage has dropped and external power is disconnected, an output voltage of the multi-phase power delivery system other than the first phase output voltage is coupled to drive circuitry of a first voltage regulator of the multi-phase power delivery system. For example, by toggling the first power selection switch 216 to the external position, an output voltage of the third phase of the multi-phase power delivery system may be coupled via the electrical coupling 394, through the first switch 340 of the relay 380, and to the drive circuitry 370. Alternatively, at step 614, when the first phase output voltage has dropped and external power is connected, power from an external power source may be coupled to the first voltage regulator of the multi-phase power delivery system. For example, due to the toggling of the first switch 340 of the relay 380 to the normally-open position based on current flowing in the relay coil 382 of the relay 380 from the external power source, power from the external power source terminals 218 may be coupled to the drive circuitry 370, as discussed above.

Continuing from either step 614 or 616 or, if no drop in the first phase output voltage is detected at step 610, the process proceeds to step 620, where it is determined whether the second phase output voltage of the multi-phase power delivery system has dropped. Again, the drop may be attributed to a de-energization, disconnection, or other power loss or failure on the second phase of the multi-phase power delivery system. The drop may be determined with reference to the display 202 and/or other indicators of the main control module 102, which may indicate when certain phases of a multi-phase power delivery system have dropped in line voltage below a certain preconfigured level. Alternatively or additionally, the drop may also be using a voltmeter on the connection terminals 229 of the voltage regulator controller 100.

When it is determined, at step 620, that the second phase output voltage has dropped, the process proceeds to step 622. Based on whether external power is connected, the method 600 further proceeds to either step 624 or 626. Particularly, if external power is disconnected, the process proceeds to step 626. Alternatively, if external power is connected, the process proceeds to step 624. With reference to the voltage regulator controller 100 as an example, external power may be connected at the external power source terminals 218 and, depending upon whether power is connected at the external power source terminals 218, the method 600 proceeds to either step 624 or 626.

At step 626, when the second phase output voltage has dropped and external power is disconnected, an output voltage of the multi-phase power delivery system other than the second phase output voltage is coupled to drive circuitry of a second voltage regulator of the multi-phase power delivery system. For example, by toggling the second power selection switch 226 to the external position, an output voltage of the first phase of the multi-phase power delivery system may be coupled via the electrical coupling 390, through the second switch 350 of the relay 380, and to the drive circuitry 372. Alternatively, at step 624, when the second phase output voltage has dropped and external power is connected, power from an external power source may be coupled to the second voltage regulator of the multi-phase power delivery system. For example, due to the toggling of the second switch 350 of the relay 380 to the normally-open position based on current flowing in the relay coil 382 of the relay 380 from the external power source, power from the external power source terminals 218 may be coupled to the drive circuitry 372, as discussed above.

Referring now to FIG. 6B, continuing from either step 624 or 626 or, if no drop in the second phase output voltage is detected at step 620, the process proceeds to step 630, where it is determined whether the third phase output voltage of the multi-phase power delivery system has dropped. Again, the drop may be attributed to a de-energization, disconnection, or other power loss or failure on the third phase of the multi-phase power delivery system. The drop may be determined with reference to the display 202 and/or other indicators of the main control module 102, which may indicate when certain phases of a multi-phase power delivery system have dropped in line voltage below a certain preconfigured level. Alternatively or additionally, the drop may also be using a voltmeter on the connection terminals 239 of the voltage regulator controller 100.

When it is determined, at step 630, that the third phase output voltage has dropped, the process proceeds to step 632. Based on whether external power is connected, the method 600 further proceeds to either step 634 or 636. Particularly, if external power is disconnected, the process proceeds to step 636. Alternatively, if external power is connected, the process proceeds to step 634. With reference to the voltage regulator controller 100 as an example, external power may be connected at the external power source terminals 218 and, depending upon whether power is connected at the external power source terminals 218, the method 600 proceeds to either step 634 or 636.

At step 636, when the third phase output voltage has dropped and external power is disconnected, an output voltage of the multi-phase power delivery system other than the third phase output voltage is coupled to drive circuitry of a third voltage regulator of the multi-phase power delivery system. For example, by toggling the third power selection switch 236 to the external position, an output voltage of the second phase of the multi-phase power delivery system may be coupled via the electrical coupling 392, through the third switch 360 of the relay 380, and to the drive circuitry 374. Alternatively, at step 634, when the third phase output voltage has dropped and external power is connected, power from an external power source may be coupled to the third voltage regulator of the multi-phase power delivery system. For example, due to the toggling of the third switch 360 of the relay 380 to the normally-open position based on current flowing in the relay coil 382 of the relay 380 from the external power source, power from the external power source terminals 218 may be coupled to the drive circuitry 374, as discussed above.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A multi-phase voltage regulator controller, comprising:
    a first switch of a relay; and
    a first power switch comprising a common pole, a first pole, and a second pole, the common pole of the first power switch being electrically coupled to drive circuitry of a first voltage regulator of a multi-phase power delivery system, the first pole of the first power switch being electrically coupled to a first phase output voltage of the multi-phase power delivery system, and the second pole of the first power switch being electrically coupled to a common pole of the first switch of the relay, wherein the first phase output voltage of the multi-phase power delivery system and a voltage other than the first phase output voltage of the multi-phase power delivery system are each selectable via the first power switch to power the drive circuitry of the first voltage regulator through the first power switch.

2. The multi-phase voltage regulator controller of claim 1, wherein
    the voltage other than the first phase output voltage of the multi-phase power delivery system is an output voltage of the multi-phase power delivery system other than the first phase output voltage,
    the common pole of the first switch of the relay is normally closed to the output voltage of the multi-phase power delivery system other than the first phase output voltage, and
    the first power switch is provided for manually coupling the drive circuitry of the first voltage regulator to the output voltage of the multi-phase power delivery system other than the first phase output voltage.

3. The multi-phase voltage regulator controller of claim 1, wherein the common pole of the first switch of the relay is normally open to an external power source and wherein the voltage other than the first phase output voltage of the multi-phase power delivery system is the external power source.

4. The multi-phase voltage regulator controller of claim 1, further comprising
    a second switch of the relay; and
    a second power switch comprising a common pole, a first pole, and a second pole, the common pole of the second power switch being electrically coupled to drive circuitry of a second voltage regulator of the multi-phase power delivery system, the first pole of the second power switch being electrically coupled to a second phase output voltage of the multi-phase power delivery system, and the second pole of the second power switch being electrically coupled to a common pole of the second switch of the relay, wherein the second phase output voltage of the multi-phase power delivery system and a second voltage other than the second phase output voltage of the multi-phase power delivery system are each selectable via the second power switch to power the drive circuitry of the second voltage regulator.

5. The multi-phase voltage regulator controller of claim 4, wherein
    the second voltage other than the second phase output voltage of the multi-phase power delivery system is an output voltage of the multi-phase power delivery system other than the second phase output voltage,
    the common pole of the second switch of the relay is normally closed to an output voltage of the multi-phase power delivery system other than the second phase output voltage, and
    the second power switch is provided for manually coupling the drive circuitry of the second voltage regulator to the output voltage of the multi-phase power delivery system other than the second phase output voltage.

6. The multi-phase voltage regulator controller of claim 4, wherein the common pole of the second switch of the relay is normally open to an external power source and wherein the second voltage other than the second phase output voltage of the multi-phase power delivery system is the external power source.

7. The multi-phase voltage regulator controller of claim 4, further comprising
    a third switch of the relay; and
    a third power switch comprising a common pole, a first pole, and a second pole, the common pole of the third power switch being electrically coupled to drive circuitry of a third voltage regulator of the multi-phase power delivery system, the first pole of the third power switch being electrically coupled to a third phase output voltage of the multi-phase power delivery system, and the second pole of the third power switch being electrically coupled to a common pole of the third switch of the relay, wherein the third phase output voltage of the multi-phase power delivery system and a third voltage other than the third phase output voltage of the multi-phase power delivery system are each selectable via the third power switch to power the drive circuitry of the third voltage regulator.

8. The multi-phase voltage regulator controller of claim 7, wherein
    the third voltage other than the third phase output voltage of the multi-phase power delivery system is an output voltage of the multi-phase power delivery system other than the third phase output voltage,
    the common pole of the third switch of the relay is normally closed to an output voltage of the multi-phase power delivery system other than the third phase output voltage, and the third power switch is provided for manually coupling the drive circuitry of the third voltage regulator to the output voltage of the multi-phase power delivery system other than the third phase output voltage.

9. The multi-phase voltage regulator controller of claim 7, wherein the common pole of the third switch of the relay is normally open to an external power source and wherein the third voltage other than the third phase output voltage of the multi-phase power delivery system is the external power source.

10. The multi-phase voltage regulator controller of claim 7, wherein, for each of the first, second, and third power switches, the switch electrically couples one of the first and second poles to the common pole based on the position of the switch.

11. The multi-phase voltage regulator controller of claim 1, wherein the relay further comprises a relay coil that, when energized, electrically couples the common pole of the first switch of the relay to the voltage other than the first phase output voltage of the multi-phase power delivery system, wherein the voltage other than the first phase output voltage of the multi-phase power delivery system is an external power source.

12. The multi-phase voltage regulator controller of claim 7, wherein the relay further comprises a relay coil that, when energized, electrically couples the common poles of the first, second, and third switches of the relays to an external power source.

13. A multi-phase voltage regulation system, comprising:
a first voltage regulator of a multi-phase power delivery system; and
a voltage regulator controller comprising a first power switch, the first power switch electrically coupled to drive circuitry of the first voltage regulator, wherein a first phase output voltage of the multi-phase power delivery system and a second phase output voltage of the multi-phase power delivery system are each selectable to power to the drive circuitry of the first voltage regulator via the first power switch.

14. The multi-phase voltage regulation system of claim 13, wherein the first power switch selectively toggles an electrical coupling between the drive circuitry of the first voltage regulator and one of the first phase output voltage and the second phase output voltage.

15. The multi-phase voltage regulation system of claim 13, further comprising
a second voltage regulator of the multi-phase power delivery system; and
a second power switch electrically coupled to drive circuitry of a second voltage regulator, to the second phase output voltage of the multi-phase power delivery system, and to a third phase output voltage of the multi-phase power delivery system.

16. The multi-phase voltage regulation system of claim 15, wherein the second power switch selectively toggles an electrical coupling between the drive circuitry of the second voltage regulator and one of the second phase output voltage and the third phase output voltage.

17. The multi-phase voltage regulation system of claim 13, further comprising
a third voltage regulator of the multi-phase power delivery system; and
a third power switch electrically coupled to drive circuitry of a third voltage regulator, to the third phase output voltage of the multi-phase power delivery system, and to the first phase output voltage of the multi-phase power delivery system.

18. The multi-phase voltage regulation system of claim 17, wherein the third power switch selectively toggles an electrical coupling between the drive circuitry of the third voltage regulator and one of the third phase output voltage and the first phase output voltage.

19. A method of powering a multi-phase voltage regulator controller, comprising:
determining whether a voltage level of a first phase output voltage of a multi-phase power delivery system has dropped below a preconfigured voltage level; and
when the first phase output voltage has dropped below the preconfigured voltage level and no external power is connected to the voltage regulator controller, coupling an output voltage of the multi-phase power delivery system other than the first phase output voltage to drive circuitry of a first voltage regulator of the multi-phase power delivery system.

20. The method of claim 19, further comprising, when the first phase output voltage has dropped below the preconfigured voltage level and external power is connected, coupling power from an external power source to the drive circuitry of the first voltage regulator.

* * * * *